United States Patent [19]

Berckes

[11] 4,347,905

[45] Sep. 7, 1982

[54] TEST WEIGHT SCALE

[76] Inventor: David H. Berckes, Rte. 3, Box 210, Canby, Minn. 56220

[21] Appl. No.: 214,277

[22] Filed: Dec. 8, 1980

[51] Int. Cl.³ .................... G01G 19/56; G01G 1/18
[52] U.S. Cl. .................................. 177/149; 177/246
[58] Field of Search ......... 177/126, 149, 150, 246–252

[56] References Cited

U.S. PATENT DOCUMENTS 3,057,421 10/1962 Fann .................................. 177/149
3,759,337 9/1973 Luedke et al. .................. 177/251 X Primary Examiner—George H. Miller, Jr.

Attorney, Agent, or Firm—Williamson, Bains, Moore & Hansen

[57] ABSTRACT

A portable, hand-held test weight scale for testing the bushel weight of grains. A slide beam having weight increments marked along its length is joined at one end to a grain cannister of predetermined volume. Means are provided for pivotally suspending the scale at a point of pivotal attachment to the beam, and a weight slidably supported on the beam is slidably adjusted thereon until the scale is balanced. A balanced condition is indicated by the level orientation of the beam as it is pivotally suspended.

10 Claims, 4 Drawing Figures

U.S. Patent  Sep. 7, 1982  4,347,905
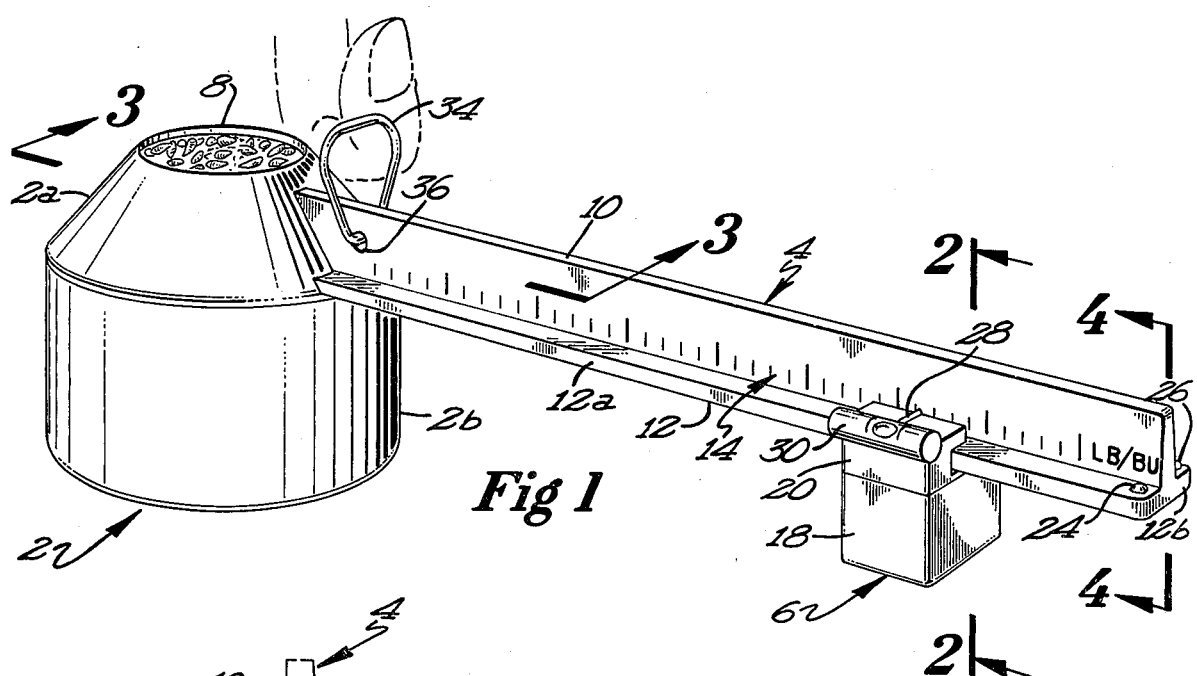
Fig 1
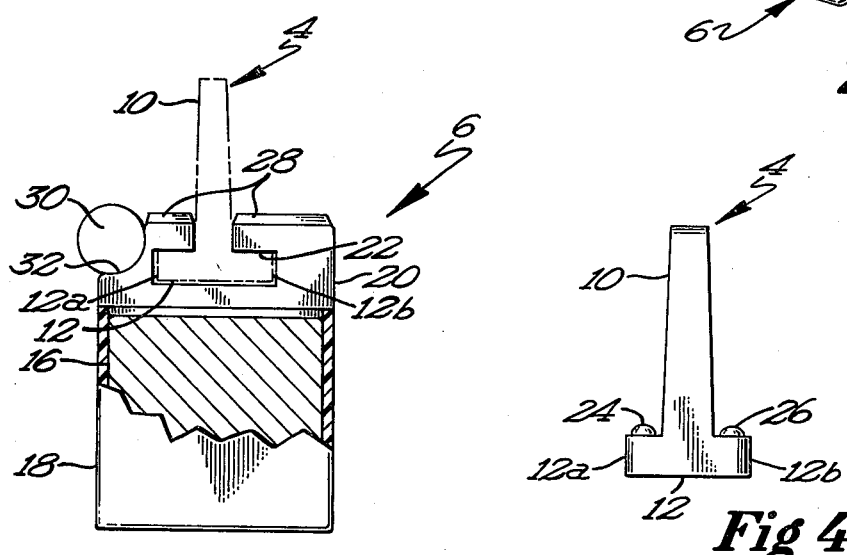
Fig 2
Fig 4
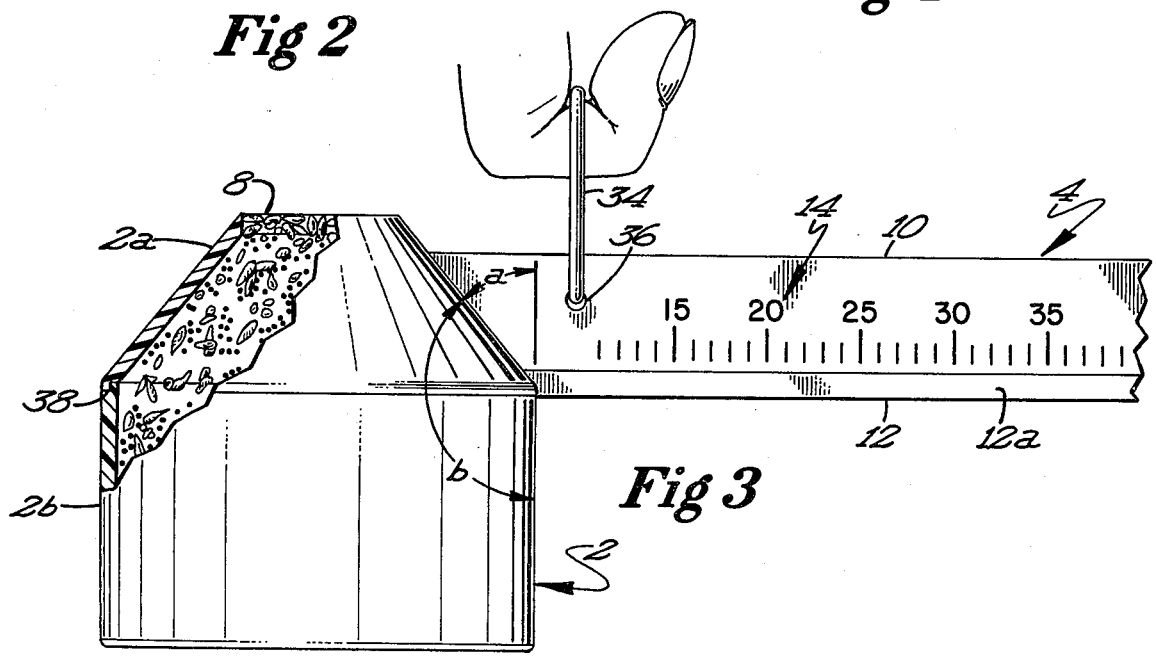
Fig 3

TEST WEIGHT SCALE

BACKGROUND OF THE INVENTION

Scales are commonly employed to test the bushel weight of grain. Such scales as used, for example, at grain elevators are large, expensive pieces of equipment. There are no small, portable scales available for use by farmers in weight testing grain.

A small scale for weighing fertilizer is known. That scale, as distributed by Midland Cooperative, Inc. of St. Paul, Minn., is a balance beam scale having weight increment notches on the beam for support on a knife edge. The spacing of the notches does not permit the precise weight measurements required in the test weighing of grains.

Accordingly, the test weight scale disclosed herein has been developed with a view towards meeting the need of farmers for a portable scale capable of providing reasonably accurate test weight measurements of a variety of grains on a per bushel basis.

BRIEF SUMMARY OF THE INVENTION

The test weight scale of this invention is particularly characterized by a small, simple, and inexpensive construction permitting hand held, portable use for accurately testing the bushel weight of various grains. Such weight measurements are of particular importance to farmers in the course of testing yields of different seed varieties as well as in determining the holding capacity of grain bins. The scale is calibrated so as to provide reasonably accurate bushel weight testing of all grains, including corn, sorgum, wheat, barley, flax, soybeams, sunflowers, and oats.

These basic objectives are realized by utilizing a compact, lightweight scale assembly comprised of a grain cannister of predetermined volume, a slide beam joined at one end to the cannister, a weight slidably supported on the beam, and pivot support means on the beam for suspending it at a location between the cannister and the opposite, free end of the beam. With the scale suspended at the pivot support point, as may be readily done by hand, and the cannister loaded with grain, the weight is slidably adjusted on the beam until the beam assumes a level, substantially horizontal orientation indicative of a balanced condition. The test weight is read directly from a scale on the beam as indicated by a marker on the slidable weight. To that end weight scale increments are marked along the length of the scale beam in a predetermined calibration proportional to the volume of the cannister. The calibration is such that the test weight may be directly read in pounds per bushel or other desired weight per volume increments.

Preferably, the aforesaid pivot support means comprises an aperture in the beam through which a ring is attached. The beam and cannister scale may be suspended for weighing purposes from the user's finger, or the ring may be hung on an elevated hook or nail.

As a particularly advantageous feature, a level indicator in the form of a bubble vial is mounted on the slidable weight. The weight is slidably adjusted until a true, level condition of the beam is observed on the indicator thereby permitting quite accurate test weight measurements.

A further beneficial aspect of the test weight scale of this invention resides in the use of a grain cannister having an upper end of frostro-conical configuration with inclined side walls terminating in a top, grain receiving aperture small enough to permit the use of a finger to strike off excess grain level with the top of the cannister.

A sturdy and durable scale of small proportions is provided in a lightweight, inexpensive assembly as aforesaid by molding the beam and cannister from plastic. Preferably, the beam and the conical upper end of the cannister are molded as one piece. The cylindrical lower end of the cannister is molded as a separate piece, and the two pieces are glued together.

These and other objects and advantages of my invention will become readily apparent as the following description is read in conjunction with the accompanying drawings wherein like reference numerals have been utilized to designate like elements throughout the several views.

BRIEF DESCRIPTION OF THE DRAWINGS

FIG. 1 is a perspective view of the test weight scale of this invention;

FIG. 2 is a vertical section view of the scale beam and slide weight taken along lines 2—2 of FIG. 1;

FIG. 3 is a fragmentary, section view of the grain cannister and attached slide beam segment of the weight scale, taken along lines 3—3 of FIG. 1; and FIG. 4 is an end view of the slide beam taken along lines 4—4 of FIG. 1.

DESCRIPTION OF THE PREFERRED EMBODIMENT

The test weight scale of this invention has been designed with a view towards providing a small, portable scale which may be utilized by farmers in a hand held operation for testing the bushel weight of a variety of grains. The scale assembly shown in the accompanying drawings meets those objectives. With reference to FIG. 1, the scale is comprised of a cannister 2 for receiving grain, a slide beam 4, and a weight assembly 6 slidably supported on beam 4.

Cannister 2 is sized and shaped to hold a predetermined volume of grain. Preferably, cannister 2 has an upper end of generally frustro-conical configuration with inclined side walls 2a terminating at their top ends in a grain receiving aperture 8 lying in a horizontal plane when the scale is being used. The lower end of cannister 2 is in the form of a culinder 2b. As may be noted most clearly by reference to FIG. 3, the inclined side walls 2a of the upper end of cannister 2 form an angle "a" with the vertical extensions of these cylindrical side walls of the lower cylindrical segment 2b of the cannister. Angle "a" is preferably less than 45°. As angle "a" becomes significantly greater, the complimentary included angle "b" shown in FIG. 3 which the inside faces of inclined side walls 2a form with cylindrical bottom walls 2b becomes small enough that problems could be encountered in completely filling cannister 2 with grain in the interior corners of the cannister defined by angle "b". Circular opening 8 at the top of the cannister has a diameter less than 2 inches, and preferably on the order of 1½ inches. Thus, filling aperture 8 is sufficiently small that excess grain overflowing the top of cannister 2 in the course of a filling operation may be easily struck off level with the top of the cannister with the user's finger.

Slide beam 4 is joined to cannister 2 at one end thereof, preferably along one of the inclined side walls 2a of the conical top of the cannister. The overall length of slide beam 4 is on the order of 12 inches. slide beam 4 is of inverted, T-shaped configuration as shown in FIGS. 1 and 2. This configuration of the beam is defined by an upright web 10 and a base flange 12 having shoulders 12a and 12b projecting from opposite sides of web 10. Weight scale increments shown in FIGS. 1 and 3 and generally indicated by reference numeral 14 and formed or otherwise marked along the length of slide beam 10. These weight increments are based on a predetermined calibration proportional to the volume of cannister 2 which permits the direct reading of the weight of the grain being tested for a particular volume, such as a bushel. Other weight per volume units, such as kilograms per hectaliter, may obviously be used. The spacing of the weight increments will of course vary depending upon the weight per volume units which are utilized.

Weight 6 may take various forms. In the preferred embodiment shown, it comprises a hollow box containing a mass 16 of predetermined weight, as is most clearly shown in FIG. 2. Mass 16 may advantageously be in the form of a steel cube. Weight 6 is comprised of a cube shaped box 18 closed at its upper end by a top 20. The weight box bottom and top portions 18 and 20 may preferably be molded from plastic material, with top 20 being affixed to the upper edge of base cube 18 by gluing after weight 16 is inserted therein. The top 20 of weight box 6 is formed to include an upwardly opening, inverted T-shaped guide channel 22 sized and shaped to receive base flange 12 of slide beam 4 in conforming relation therewith. Guide channel 22 is slidably supported on projections 12a and 12b of base flange 12. As is shown most clearly in FIG. 4, upwardly projecting lugs 24 and 26 are formed on base flange projections 12a and 12b on opposite sides of beam web 10. Lugs 24 and 26 serve as detent means on the free end of slide beam 4 opposite cannister 2 to prevent the sliding separation of weight box 6 from slide beam 4. In the course of initial assembly, guide channel 22 on the top of weight box 6 is forced over detents 24 and 26 on base flange 12 as the weight box is slidably mounted on slide beam 4.

Raised ridges 28 are formed on the upper surface of the top 20 of weight box 6. These ridges serve as weight scale indicating markers with respect to weight scale increments 14 on slide beam 4.

A level indicator 30 is mounted along one side of weight box 6 as shown in FIGS. 1 and 2. Level indicator 30 preferably takes the form of a well known bubble vial. This bubble vial is advantageously secured along one side wall of weight box top 20 in an arcuate recess 32 formed therein. Adhesive material may be utilized to secure bubble vial 30 in place against recess 32. Level indicator 30 is of course slidably movable with weight box 6, and is utilized to ensure that slide beam 4 is in a level, substantially horizontal position indicative of a balanced condition when reading the weight on the scale 14 of beam 4.

For the purpose of pivotally suspending the scale assembly for balancing of the grain weight load in cannister 2 by the sliding movement of weight box 6, a pivot ring 34 is affixed to slide beam 4 through an aperture 36 therein. Pivot ring 34 is located as shown close to cannister 2, and between cannister 2 and the opposite, free end of slide beam 4. The overall size and weight of the scale assembly is such that pivot ring 34 may be supported by a finger of the user. Alternatively, ring 34 can be hung from a nail or hook. The suspension of the scale assembly from pivot ring 34 permits slide beam 4 to pivot about the point where aperture 36 is engaged by ring 34.

Although the grain cannister 2 and slide beam 4 may be formed in various ways from different materials, I have found it particularly effective and economical to mold these components from plastic. Preferably, the frustro-conical upper end 2a of cannister 2 and slide beam 4 are molded together as a unitary piece. The lower, cylindrical end 2b of cannister 2 is molded as a separate piece. As is shown in FIG. 3, the circular base of conical upper end 2a of the cannister and the circular top of the cylindrical lower end 2b are fitted together in abutting relationship. For this purpose, mating shoulders 38 are formed on these two pieces along their abutting surfaces. Adhesive material is utilized to glue cannister upper end 2a to the lower end 2b.

In operation, cannister 2 is filled with grain material to be tested by pouring the material into the cannister through its upper aperture 8. The grain is struck off, clean and level with the surface of aperture 8 by the user's finger. Thereafter, ring 34 is supported on the user's finger, or on a hook. With the scale assembly thus suspended for pivotal movement about aperture 36, weight box 6 is slidably adjusted along the length of slide beam 4 until a balanced condition is reached. Such a condition will be indicated by the horizontal, level orientation of slide beam 4. Level indicator 30 may be observed as weight box 6 is slidably adjusted on beam 4 to ensure that the beam is level and that the scale is accurately balanced. The test weight per volume of the grain placed in cannister 2 is determined by simply directly reading scale 14 on slide beam 4. The precise test weight is indicated by the scale increment with which one of the weight markers 28 is aligned. Weight increments with corresponding numbers as shown on scale beam 4 are stamped or molded thereon in a predetermined calibration so that the scale is capable of providing a direct readout of the weight of all grains for a particular volume, such as one bushel. As stated above, this calibration will be proportional to the volume of cannister 2 which in actual practice has a volume of approximately one pint.

The plastic material from which cannister 2 and slide beam 4 are molded is tough and durable. Plastic designated as "ABS" has proved satisfactory for that purpose. It will be appreciated from the foregoing description that the test weight scale disclosed herein is small, portable, and readily lends itself to hand held operation by farmers. Although the scale is extremely accurate, it will be stamped "Not for legal trade" so as not to conflict with grain trade laws. It is anticipated that various changes may be made in the size, shape, and construction of the portable, test weight scale disclosed herein without departing from the spirit and scope of my invention.

What is claimed is:

1. A portable, hand held scale for testing the bushel weight of grain comprising:

a cannister of predetermined volume for receiving grain, said cannister having a lower end in the form of a cylinder and an open upper end of generally frustro-conical configuration with inclined side walls forming an angle of less than 45° with the vertical extensions of the cylindrical side walls of said lower end and terminating at the top of said cannister in a grain filling and receiving aperture lying in a horizontal plane when the scale is being used, said conical upper end and said cylindrical lower end being joined together in permanently assembled condition for all weighing operations, and said filling and receiving aperture comprising a circular opening having a diameter of an order of magnitude between one and two inches, whereby excess grain overflowing the top of said cannister through said circular opening may be struck off level with the top of the cannister with the user's finger;

a slide beam joined to said cannister at one end thereof, said slide beam having weight scale increments marked along its length in a predetermined calibration based on the volume of said cannister, permitting the direct reading of the weight of the grain being tested for a particular volume, such as a bushel;

weight means slidably supported on said beam for sliding movement along the length thereof, said weight means having a weight scale indicating marker thereon; and pivot support means on said beam located between said cannister and the opposite, free end of said beam, whereby said scale may be suspended from said pivot support means with said cannister filled with grain and said weight means slidably adjusted on said beam until said scale is in a balanced condition with said beam oriented substantially horizontally, the test weight of the grain being indicated by the scale increment with which said marker is aligned.

2. A test weight scale as defined in claim 1 wherein: said pivot support means comprises an aperture in said beam and a support ring attached to said beam through said aperture, whereby the suspension of the scale from said ring permits said beam to pivot about the point where said aperture engages the ring until said balanced condition is reached by the sliding adjustment of said weight means.

3. A test weight scale as defined in claim 1 wherein: said slide beam is of inverted T-shaped configuration comprising an upright web on which said weight scale increments are marked and a base flange having shoulders projecting from opposite sides of said upright web on which said weight means is slidably supported.

4. A test weight scale as defined in claim 3, and further including:

detent means on said base flange adjacent to the opposite free end of said beam remote from said cannister, said detent means being located in the path of sliding movement of said weight means to prevent the sliding separation of said weight means from said beam.

5. A test weight scale as defined in claim 1 wherein: said slide beam is joined to one side of said conical upper end of said cannister.

6. A test weight scale as defined in claim 5 wherein: said slide beam and cannister are molded and constructed from plastic material as a two piece assembly with said slide beam and said conical upper end of the cannister being molded as one piece and said lower end of the cannister being molded as a separate piece.

7. A test weight scale as defined in claim 6 wherein: the circular base of said conical upper end of the cannister and the circular top of said cylindrical lower end are joined together by adhesive material.

8. A test weight scale as defined in claim 1 and further including:

a level indicator mounted on said weight means for sliding movement therewith whereby said level indicator may be observed as said weight means is slidably adjusted on said beam to accurately balance said scale with said beam level and oriented horizontally.

9. A test weight scale as defined in claim 8 wherein: said weight means comprises a hollow box containing material of a predetermined weight, and means on said box slidably engaging said beam.

10. A test weight scale as defined in claim 9 wherein: said slide beam is of inverted, T-shaped configuration comprising an upright web and a base flange having shoulders projecting from opposite sides of said upright web; and an inverted, T-shaped guide channel on the top of said box slidably engaging said base flange shoulders on said beam.

* * * * *